(12) United States Patent
Kaufman

(10) Patent No.: US 9,964,946 B2
(45) Date of Patent: May 8, 2018

(54) QUALITY ASSURANCE SYSTEM AND METHOD

(71) Applicant: QUALITYLINE PRODUCTION TECHNOLOGIES LTD., Kiryat Gat (IL)

(72) Inventor: Eyal Kaufman, Shoham (IL)

( * ) Notice: Subject to any disclaimer, the term of this patent is extended or adjusted under 35 U.S.C. 154(b) by 255 days.

(21) Appl. No.: 14/822,962

(22) Filed: Aug. 11, 2015

(65) Prior Publication Data

US 2017/0045883 A1 Feb. 16, 2017

(51) Int. Cl.
| | | |
|---|---|---|
| G06F 19/00 | (2018.01) | |
| G06F 17/00 | (2006.01) | |
| G05B 19/418 | (2006.01) | |
| G06Q 10/06 | (2012.01) | |

(52) U.S. Cl.
CPC . *G05B 19/41875* (2013.01); *G06Q 10/06395* (2013.01); *G05B 2219/32368* (2013.01); *Y02P 90/22* (2015.11); *Y02P 90/26* (2015.11)

(58) Field of Classification Search
CPC .............................................. G05B 19/41875
USPC ........................................................ 700/109
See application file for complete search history.

(56) References Cited

U.S. PATENT DOCUMENTS

| | | | | |
|---|---|---|---|---|
| 5,983,240 A | * | 11/1999 | Shoroff | G06F 17/30076 |
| 6,094,684 A | * | 7/2000 | Pallmann | G06F 9/54 |
| | | | | 709/227 |
| 6,708,189 B1 | * | 3/2004 | Fitzsimons | G06F 17/30569 |
| 7,313,576 B2 | * | 12/2007 | Clark | G06F 17/30557 |
| 7,908,552 B2 | * | 3/2011 | Heinze | G06F 17/271 |
| | | | | 715/256 |
| 8,458,672 B2 | * | 6/2013 | Forster | G06F 9/4435 |
| | | | | 707/798 |
| 8,688,476 B2 | * | 4/2014 | Cinqualbre | G06Q 50/22 |
| | | | | 705/2 |
| 9,454,453 B2 | * | 9/2016 | Masuda | G06F 11/0733 |
| 2010/0257444 A1 | * | 10/2010 | Bever | G06F 17/212 |
| | | | | 715/256 |

* cited by examiner

*Primary Examiner* — Suresh Suryawanshi
(74) *Attorney, Agent, or Firm* — Alphapatent Associates, Ltd; Daniel J. Swirsky

(57) ABSTRACT

A quality assurance system, including a plurality of quality assurance stations, each for examining at least one physical product, and for producing from each physical product examination, a result thereof expressed by at least one plain text in a computer, being local to the quality assurance station thereof, an application installed in each of the local computers, for converting the plain texts to plain texts having a unified format, and an analyzing computer, for receiving the converted plain texts from the local computers, thereby the unified format accompanies the analyzing computer in analyzing the converted plain texts from distributed assurance stations.

7 Claims, 7 Drawing Sheets

QUALITY ASSURANCE SYSTEM AND METHOD

TECHNICAL FIELD

The invention relates to the field of mass production quality assurance (QA). More particularly, the invention relates to a method and apparatus for accompanying the developer regarding the quality assurance procedure of the manufacturer.

BACKGROUND

FIG. 1 is a schematic illustration of a prior art mass production Quality Assurance (QA) procedure.

Suppose a mass production physical product 16A1, such as an integrated circuit, is examined by a QA station 16B1, including a volt meter 12B2 for examining a "point" 12B1 (electric potential difference between two points) of physical product 16A1, and a thermometer 12A2 for examining a point 12A1 of physical product 16A1.

Suppose volt meter 12B2 has measured 18 volt, enumerated 12B3, providing a corresponding signal 12B4; and that thermometer 12A2 has measured 31 deg C., enumerated 12A3, providing a corresponding signal 12A4;

The term "plain text" refers herein to a text which is not binary.

A local computer 16C1 accompanied to QA station 16B1 receives signals 12A4 and 12B4, and produces therefrom a plain text file 14A1. Plain text file 14A1 may be displayed on a screen 26 for being viewed by the QA station operator 32. According to the example, screen 26 displays 31 volt on point A and 18 deg C. on point B. Operator 32 qualifies or rejects physical product 16A1, based on the results.

Plain text file 14A1 is copied to a file 14B1 in a computer 16E of the human human developer 28 of physical product 16A1, through the internet 16D, for being viewed by human developer 28.

FIG. 2 is a schematic form of the files described in FIG. 1.

Each of files 14A1 and 14B1 may include an indication 12A5 of point 12A1, a pre-determined separating characters 12A6, and a plain text 12A7 of signal 12A4; and similarly may include an indication 12B5 of point 12B1, a pre-determined separating characters 12B6, and a plain text 12B7 of signal 12B4, being a format 30A.

FIG. 3 describes handling of a plurality of procedures of FIG. 1.

Suppose the first manufactured physical product 16A1 of FIG. 1 is examined by QA station 16B1 of FIG. 1, for producing plain text file 14A1 in local computer 16C1, and plain text file 14A1 is copied to plain text file 14B1 in computer 16E; and then a second manufactured physical product 16A2 is examined again by QA station 16B1 of FIG. 1, for producing a plain text file 14A2 also in local computer 16C1, and plain text file 14A2 is copied to plain text file 14B2 in computer 16E.

In this case, since both files 14B1 and 14B2 have been produced by the same QA station 16B1 and local computer 16C1, thus having the same formatting, described in FIG. 2, then computer 16E may use an application for displaying the measurements indicated by plain text files 14A1 and 14B2 one beside the other for comparing therebetween. In the example of FIG. 1 having 2 measurements for file 14B1, and thus having 2 measurements for file 14B2, the application may produce a graph or a spreadsheet 16G for displaying the 2+2=4 measurements in a comparing form.

However, suppose the second manufactured physical product 16A2 or another physical product is examined by a QA station 16B2, for producing a plain text file 14A3 in a computer 16C2, being local to QA station 16B2, and plain text file 14A3 is copied to plain text file 14B3 in computer 16E, then computer 16E cannot display the measurements of plain text files 14A1 and 14B3 one beside the other for comparing therebetween.

Computer 16E cannot display the measurements indicated by plain text files 14A1 and 14B3 one beside the other, since files 14B1 and 14B3 have been produced by different QA stations, namely by 16B1 and 16B2, and by different local computers, namely by 16C1 and 16C2, thus typically having a different formatting from that described in FIG. 2.

Thus, the human developer 28, being acquainted with the physical product, lacks tools for comparing failures reported by QA station operator 32, for guiding QA station operator 32, how to improve the manufacturing or the examining of the next physical products.

FIG. 4 depicts the difference of the formatting from the formatting of FIG. 2.

Suppose pre-determined separating characters 12A6 of file 14B1 having format 30A as depicted in FIG. 2, may constitute 3 spaces; and pre-determined separating characters 12B6 of file 14B1 as depicted in FIG. 2, may constitute 4 spaces; then file 14B2 should have the same format 30A, namely the same 3 and 4 spaces apply to file 14B2. However, file 14B3 may have a different format 30B which may include 5 spaces instead of the 3 spaces of files 14B1 and 14B2; and 2 spaces of file 14B3 instead of the 4 spaces of files 14B1 and 14B2 having format 30A.

Another aspect is that the measurement of volt meter 12B2, according to the example of measuring 18 volt, enumerated 12B3, must be analyzed by parameters, such as range of the results, e.g., qualifying ("pass") between 16 volt and 20 volt, and disqualifying ("fail") otherwise. The problem is that changing of the parameters conventionally requires changing of the running application.

SUMMARY

In one aspect, the invention provides a method and apparatus for producing uniform formats for different QA stations 16B1 and 16B2.

In one aspect of the invention, the invention provides a solution to the above-mentioned and other problems of the prior art.

In one aspect, the invention is directed to a quality assurance system (10), including:
  a plurality of quality assurance stations (16B1, 16B1),
    each for examining at least one physical product (16A, 16A2), and
    for producing from each physical product examination, a result thereof expressed by at least one plain text (14A1, 14A2) in a computer (16C1, 16C2), being local to the quality assurance station thereof;
  an application (24) installed in each of the local computers (16C1, 16C2), for converting the plain texts (14A1, 14A2) to plain texts (20A, 20B) having a unified format (30A); and
  an analyzing computer (16E), for receiving the converted plain texts (20A, 20B) from the local computers (16C1, 16C2),
thereby the unified format (30A) accompanies the analyzing computer (16E) in analyzing the converted plain texts (20A, 20B) from distributed assurance stations (16B1, 16B1).

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of preferred embodiments of the invention, which are meant to be descriptive and not limiting. For the sake of brevity, some well-known features, methods, systems, procedures, components, circuits, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
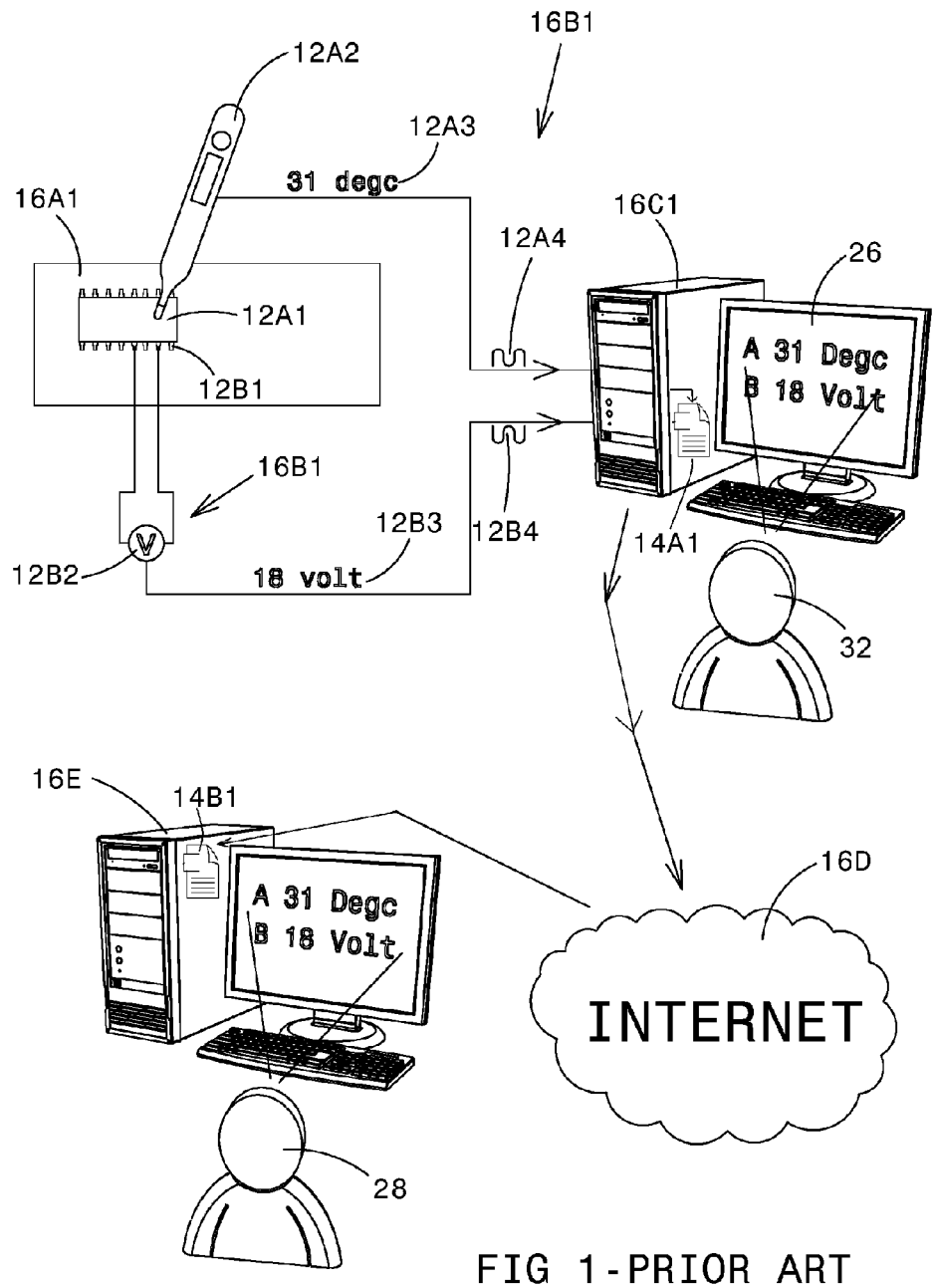
FIG. 1 is a schematic illustration of a prior art mass production Quality Assurance (QA) procedure.
Figure 2:
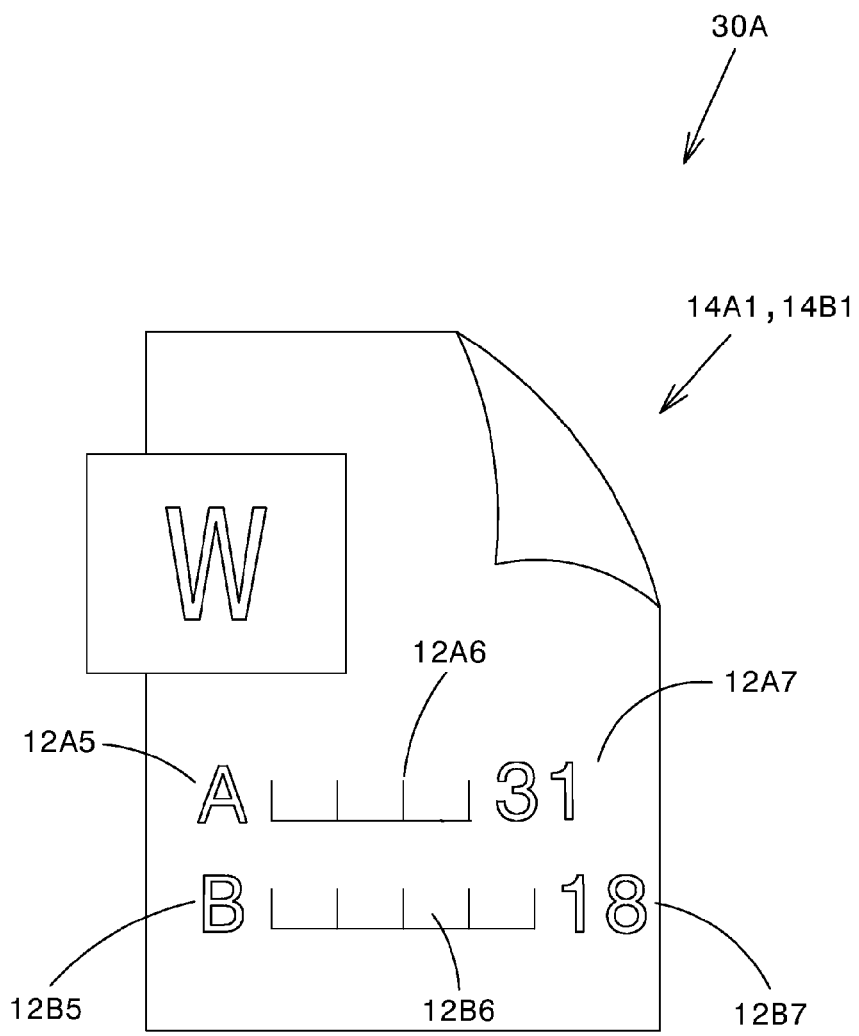
FIG. 2 is a schematic form of the files described in FIG. 1.
Figure 5:
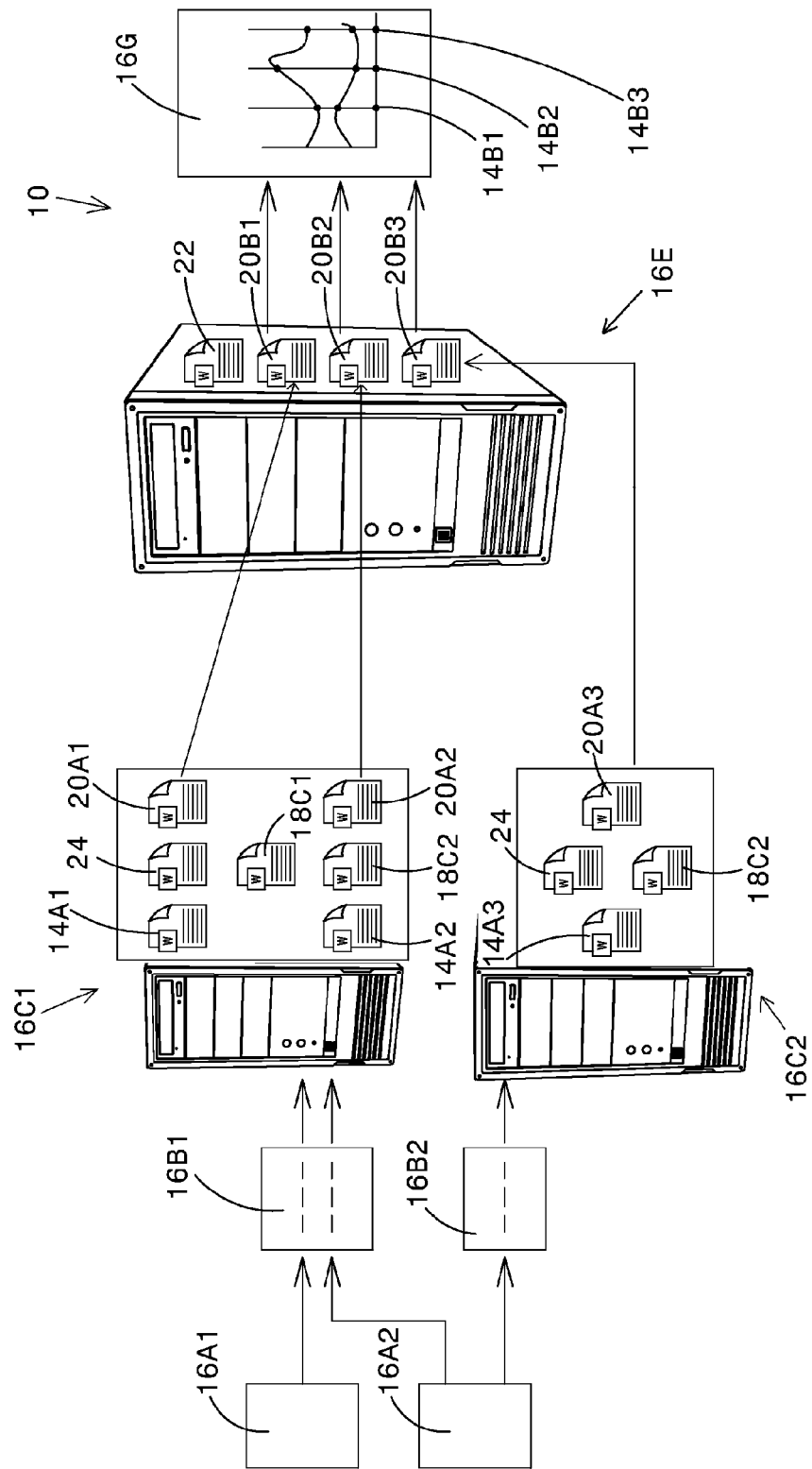
FIG. 5 depicts a system for handling a plurality of procedures of FIG. 1 for different Quality Assurance (QA) stations, according to one embodiment of the invention.

FIG. 5 depicts a system for handling a plurality of procedures of FIG. 1 for different Quality Assurance (QA) stations, according to one embodiment of the invention.

Figure 3:
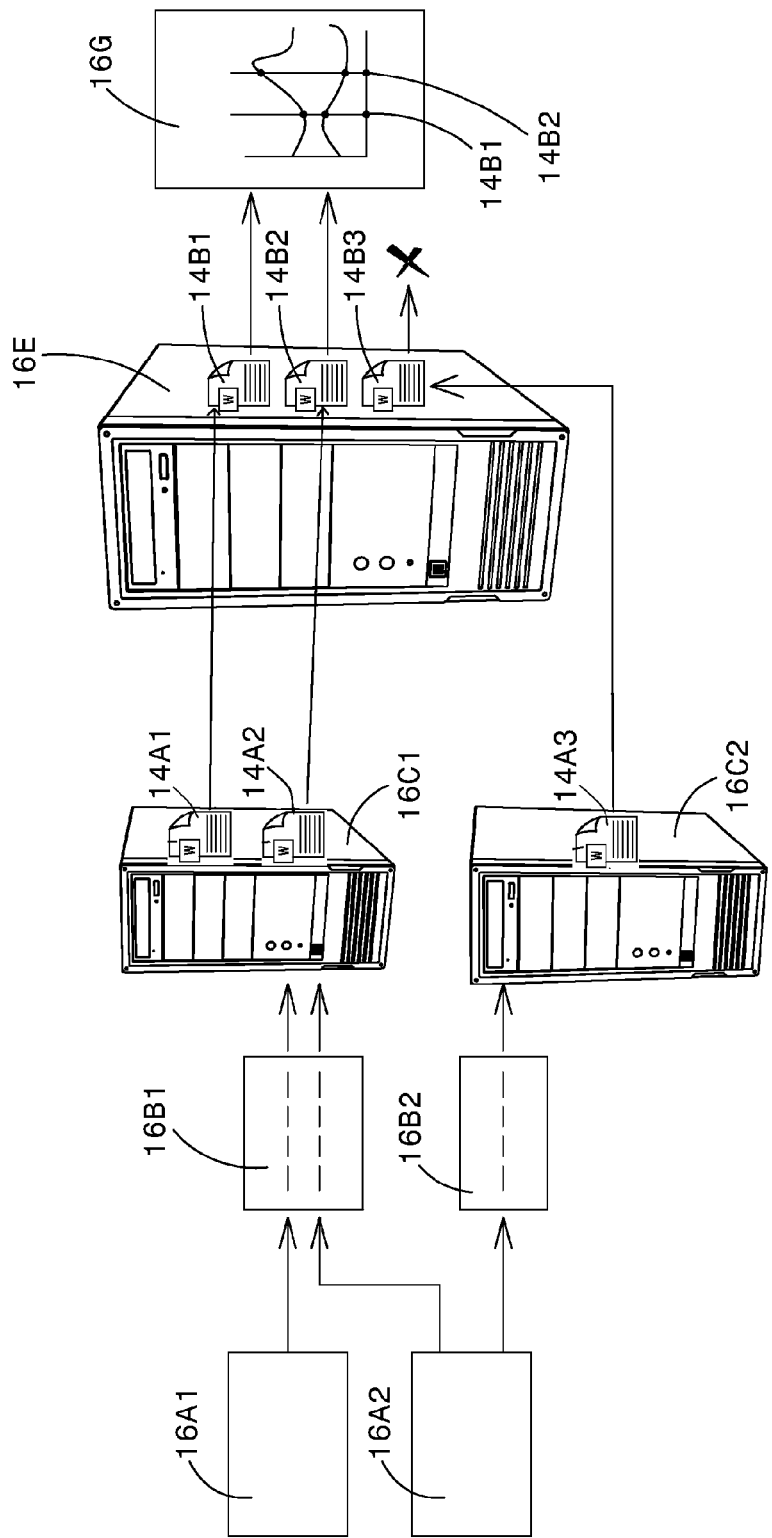
FIG. 3 describes handling of a plurality of procedures of FIG. 1.

Regarding the example of FIG. 3, the first manufactured physical product 16A1 of FIG. 3 is examined by QA station 16B1 of FIG. 3, for producing plain text file 14A1 of FIG. 3 in local computer 16C1.

System 10 is different from the system of FIG. 3 in that local computer 16C1 converts plain text file 14A1 to a plain text file 20A1 having a format, being regarded by the system to be standard\unified Plain text file 20A1 is copied to a plain text file 20B1 in computer 16E.

Then, the second manufactured physical product 16A2 of FIG. 3 is examined again by QA station 16B1, for producing plain text file 14A2 of FIG. 3 in local computer 16C1. Local computer 16C1 converts plain text file 14A2 to a plain text file 20A2 having the standard format. Plain text file 20A2 is copied to a plain text file 20B2 in computer 16E.

Regarding the example of FIG. 3 that the second manufactured physical product 16A2 or another physical product is now examined by QA station 16B2, for producing plain text file 14A3 of FIG. 3 in computer 16C2, being local to QA station 16B2, local computer 16C2 then converts plain text file 14A3 to a plain text file 20A3 having the standard format. Plain text file 20A3 is copied to a plain text file 20B3 in computer 16E.

In this case, since all of files 20B1, 20B2, and 20B3 have been produced to have the same format, even though by different QA stations, namely 16B1 and 16B2, and by different local computers, namely 16C1 and 16C2, then computer 16E may use an application for displaying the measurements of plain text files 20B1, 20B2, and 20B3 one beside the other for comparing therebetween. In the example of FIG. 1 having 2 measurements for file 14B1, and thus having 2 measurements for file 14B2 and 2 measurements for file 14B3, the application may produce graph or spreadsheet 16G for displaying the 2+2+2=6 measurements in the comparing form of FIG. 3.

Figure 4:
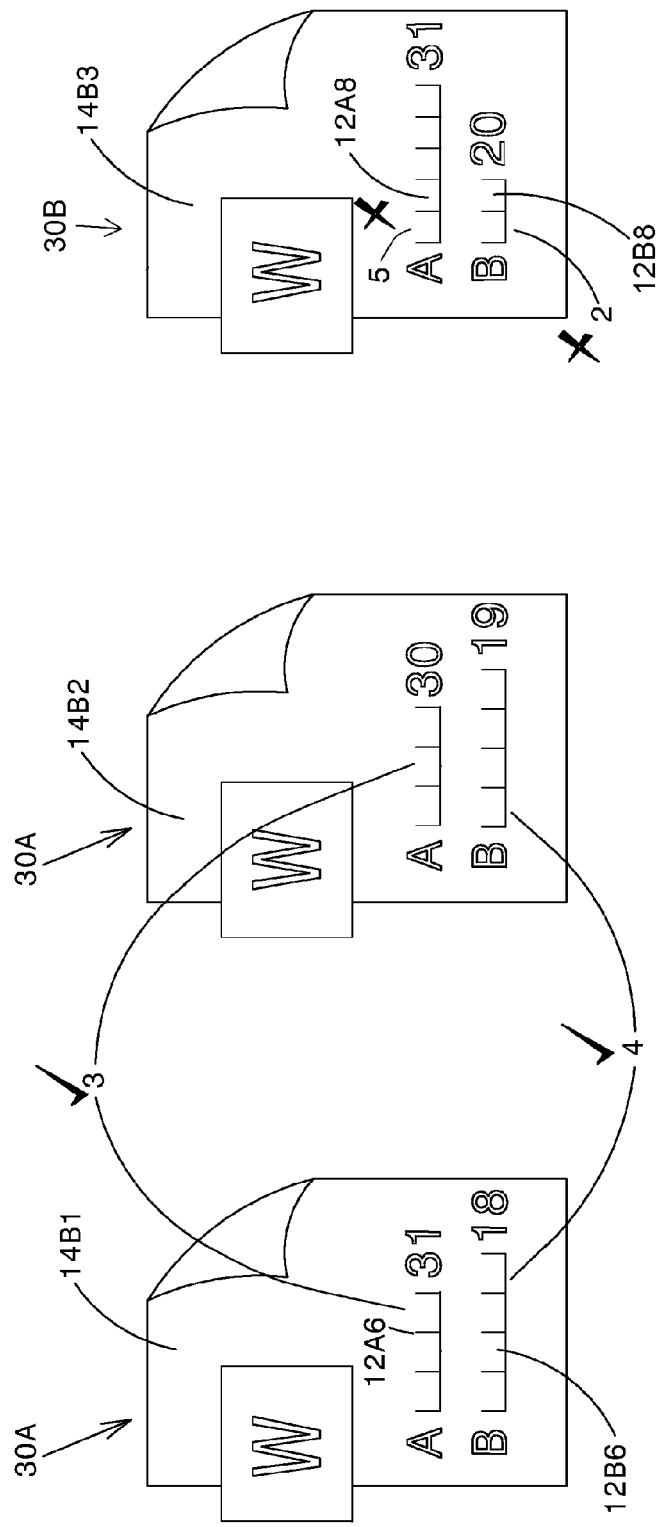
FIG. 4 depicts the difference of the formatting from the formatting of FIG. 2.
Figure 6:
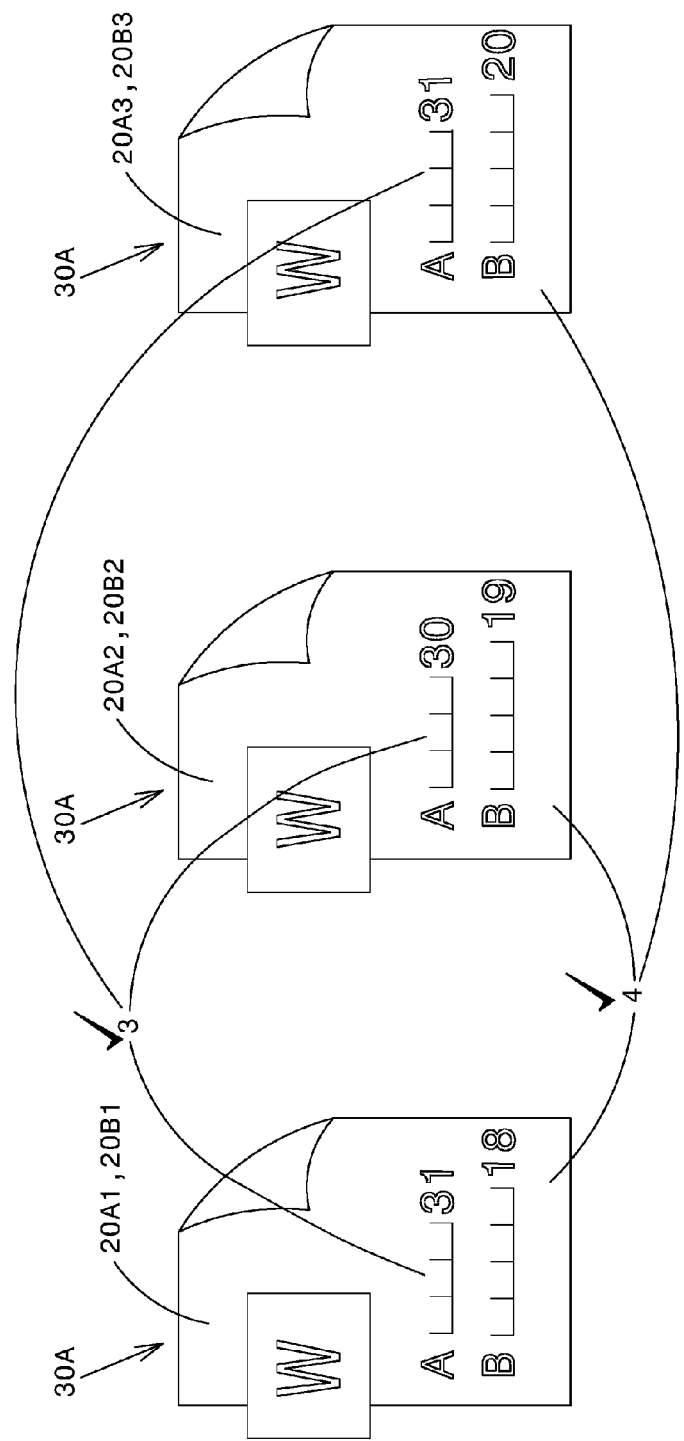
FIG. 6 depicts the uniformity of the formatting, being in contrast to FIG. 4.

FIG. 6 depicts the uniformity of the formatting, being in contrast to FIG. 4.

Regarding the example of FIG. 4 that pre-determined separating characters 12A6 of file 14B1 are of format 30A including 3 spaces, and pre-determined separating characters 12B6 of file 14B1 include 4 spaces, format 30A having these spaces may be determined to be the standard format, and thus files 20A1 and 20B1 may have the same format 30A, namely pre-determined separating characters 12A6 of files 20A1 and of 20B1 may also include 3 spaces, and pre-determined separating characters 12B6 of files 20A1 and of 20B1 may also include 4 spaces.

The same 3 and 4 spaces which have been applied to file 14B2, apply to files 20A2 and 20B2.

QA station 16B2 and computer 16C2, which have produced plain text file 14A3 of FIG. 4 having pre-determined separating characters 12A8 of 5 spaces, instead of the 3 spaces of files 14B1 and 14B2, and pre-determined separating characters 12B8 of 2 spaces of file 14B3 instead of the 4 spaces of files 14B1 and 14B2, produces also file 20A3, being converted from file 14B3, to have the same format 30A, having 3 and 4 spaces, being regarded the standard format 30A.

Figure 7:
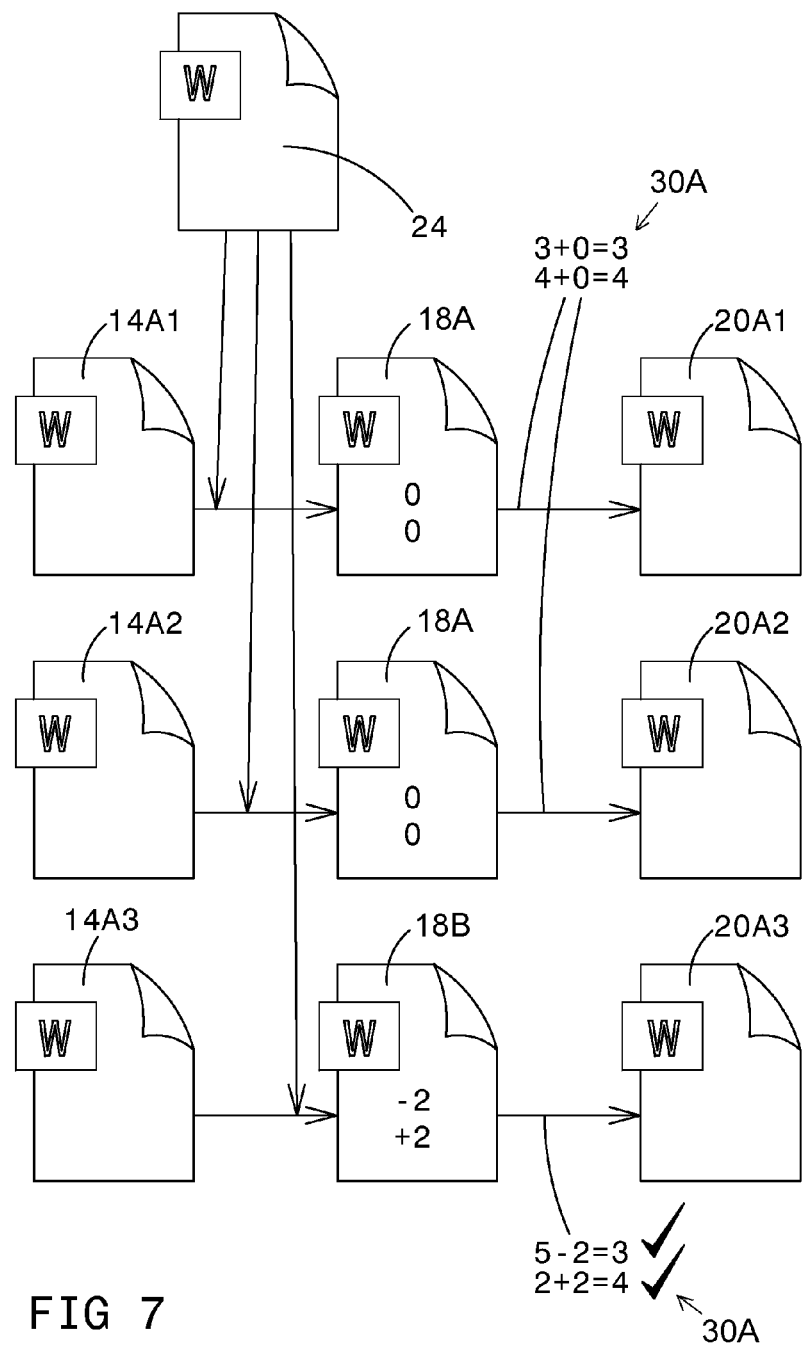
FIG. 7 depicts the operation of the conversion, described in FIGS. 5 and 6.

FIG. 7 depicts the operation of the conversion, described in FIGS. 5 and 6.

Regarding the example of FIG. 6 that pre-determined separating characters 12A6 of file 14B1 include 3 spaces, and pre-determined separating characters 12B6 of file 14B1 include 4 spaces, and that these spaces may be determined to be the standard format, no conversion is required for obtaining format 30A, and thus file 20A1 is equal to file 14A1.

Thus, a configuration file 18A may include the information for converting file 14A1 to file 20A1. Configuration file 18A may include a zero for converting the 3 spaces of 12A6 to 3 spaces, and another zero for converting the 4 spaces of 12B6 to 4 spaces.

In the same manner, the same configuration file 18A converts file 14A2 to file 20A2.

Regarding the example of FIG. 6 that file 14B3 includes pre-determined separating characters 12A8 of 5 spaces, and pre-determined separating characters 12B8 of 4 spaces, not being the standard format 30A, a configuration file 18B for converting file 14A3 to file 20A3, includes −2 (minus two) for converting the 5 spaces of 12A8 to 3 spaces, by −2+5=3; and includes +2 (plus two) for converting the 2 spaces of 12B8 to 4 spaces, by 2+2=4, thus having format 30A.

Configuration files 18A and 18B may be produced manually by human developer 28, after viewing 14A1, 14A2 and 14A3, for accompanying computerized receipt of many files having the non-unified format of those files.

Referring again to FIG. 5, an application 24 operates the conversion, such as of the simple mathematical additions of (−2)+5=3 and of the 2+2=4 described at the last paragraph.

Referring again to FIG. 5, local computers 16C1 and 16C2 run equal applications 24; but the configuration files are different, namely local computer 16C1 uses configuration file 18A and local computer 16C2 uses configuration file 18B.

Computer 16E of human developer 28 includes an application 22, being compatible with application 24 of local computers 16C1 and 16C2. Computer 16E of human developer 28 transfers application 24 of to each of local computers 16C1 and 16C2 only once.

Then, application 22 of human developer 28 prepares and transfers configuration file 18A and 18B to local computers 16C1 and 16C2 respectively, for receiving the same format from both.

Application 22 of human developer 28 may prepare and transfer different configuration files, namely 18A and 18B, to the same local computers 16C1, each for examining a different physical product, namely 16A1 and 16A2, for receiving the same format from both.

It is advantaged that local computers 16C1 and 16C2, and other local computers, execute the format processing, for servicing computer 16E of human developer 28, being the central computer, since this format processing requires the significant computer power.

Changes over time and in programs of examination, for suiting various physical products, being different from physical products 16A1 and 16A2, neither require replacing of application 24 of local computers 16C1 and 16C2, nor or of application 22 of computer 16E of human developer 28, but rather amendments in configuration files 18A and 18B, being relatively small files.

Configuration files 18A and 18B may contain parameters, such as ranges of the measurements, for qualifying and disqualifying the products. Thus, computer 16E of human developer 28 may conveniently change the parameters, such as the ranges, for forwarding them to local computers 16C1 and 16C2, which physically pass or fail the products.

Further, the amendments in configuration files 18A and 18B do not disable local computers 16C1 and 16C2, during the file transfer.

Application 24 of local computers 16C1 may initiate periodical inquiries to application 22 of central computer 16E whether configuration file 18A must be amended; and application 24 of local computers 16C2 may initiate periodical inquiries to application 22 of central computer 16E whether configuration file 18B must be amended.

Thus, in one aspect, the invention is directed to a quality assurance system (10), including:
  a plurality of quality assurance stations (16B1, 16B1),
    each for examining at least one physical product (16A, 16A2), and
    for producing from each physical product examination, a result thereof expressed by at least one plain text (14A1, 14A2) in a computer (16C1, 16C2), being local to the quality assurance station thereof;
  an application (24) installed in each of the local computers (16C1, 16C2), for converting the plain texts (14A1, 14A2) to plain texts (20A, 20B) having a unified format (30A); and
  an analyzing computer (16E), for receiving the converted plain texts (20A, 20B) from the local computers (16C1, 16C2),
thereby the unified format (30A) accompanies the analyzing computer (16E) in analyzing the converted plain texts (20A, 20B) from distributed assurance stations (16B1, 16B1).

The quality assurance system (10) may further include:
  a configuration file (18A, 18B), being present in each of the local computers (16C1, 16C2),
    for defining the conversion of each plain text (14A1, 14A2) to the plain texts (20A, 20B) having the unified format (30A), and
    for being used by the application (24) in the converting of the plain texts (14A1, 14A2) to the plain texts (20A, 20B) having the unified format (30A),
thereby the application (24) need not include a definition of the conversion.

The configuration file (18A, 18B), being present in each of the local computers (16C1, 16C2), may be
  for defining parameters of the examination of the at least one physical product (16A, 16A2), and
  for being used by the application (24) in analysis of the plain texts (20A, 20B) having the unified format (30A),
thereby the application (24) need not include a definition of the examination parameters.

In another aspect, the invention is directed to a quality assurance method, including the steps of:
  examining at least one physical product (16A, 16A2), each by a plurality of quality assurance stations (16B1, 16B1);
  producing from each of the examinations at least one plain text (14A1, 14A2) in a computer (16C1, 16C2), being local to a quality assurance station thereof;
  converting, by the local computers (16C1, 16C2), the plain texts (14A1, 14A2) to plain texts (20A, 20B) having a unified format (30A); and
  receiving the converted plain texts (20A, 20B) from the local computers (16C1, 16C2) to a central computer (16E),
thereby the unified format (30A) accompanies the central computer (16E) in analyzing the converted plain texts (20A, 20B).

The quality assurance method may further include the steps of:
  manually preparing a configuration file (18A);
  manually transferring the prepared configuration file (18A, 18B) to the local computers (16C1, 16C2); and
  running an application (24) by the local computer (16C1), for using the configuration file (18A) in the step of converting, by the local computers (16C1, 18B), the plain texts (14A1, 14A2) to plain texts (20A, 20B) having the unified format (30A).

The step of analyzing the converted plain texts (20A, 20B) may include computed comparing of different converted plain texts (20A, 20B).

The step of converting, by the local computers (16C1, 18B), the plain texts (14A1, 14A2) to plain texts (20A, 20B) having the unified format (30A), may include the steps of:
  providing configuration files (18A, 18B) to the local computers (16C1, 16C2); and
  running an application (24) by each of the local computers (16C1, 16C2), for using the configuration files (18A, 18B).

The quality assurance method may further include the step of:
  amending the provided configuration files (18A, 18B), and transferring thereof to the local computers (16C1, 16C2),
thereby upon the running of the application (24) by each of the local computers (16C1, 16C2), obtaining a different format.

The quality assurance method may further include the step of:

initiating, by the local computers (16C1, 16C2), periodical inquires from the central computer (16E), whether the provided configuration files (18A, 18B) must be amended.

In the figures and/or description herein, the following reference numerals (Reference Signs List) have been mentioned:

numeral 10 denotes the quality assurance system, according to one embodiment of the invention;

numeral 12A1 denotes a point being measured by a QA station;

numeral 12A2 denotes a thermometer;

numeral 12A3 denotes the measurement of the thermometer;

numeral 12A4 denotes the signal, provided to the computer, corresponding to the measurement of the thermometer;

numeral 12A5 denotes an indication in the produced file that the following plain text is of the measurement of the thermometer;

numeral 12A6 denotes characters separating the indication from the plain text of the measurement of the thermometer;

numeral 12B7 denotes the plain text in the file, of temperature measurement;

numeral 12A8 denotes characters separating the indication from the plain text of the temperature measurement, for another examined physical product;

numeral 12B1 denotes a point being measured by the QA station;

numeral 12B2 denotes a volt meter;

numeral 12B3 denotes the measurement of the volt meter;

numeral 12B4 denotes the signal, provided to the computer, corresponding to the measurement of the volt meter;

numeral 12B5 denotes an indication in the produced file that the following plain text is of the measurement of the volt meter;

numeral 12B6 denotes characters separating the indication from the plain text of the measurement of the volt meter;

numeral 12B7 denotes the plain text in the file, of volt measurement;

numeral 12B8 denotes characters separating the indication from the plain text of the voltage measurement, for the other examined physical product;

numerals 14A1, 14A2 and 14A3 denote files produced by the QA station and the local computer;

numerals 14B1, 14B2 and 14B3 denote files transferred to the central computer;

numerals 16A1 and 16A2 denote mass production physical products, such as integrated circuits, to be examined;

numerals 16B1 and 16B2 denote different QA stations;

numerals 16C1 and 16C2 denote computers accompanied to QA stations, thus being local in relation to the QA stations, in contrast to the central computer being distanced from the QA stations, typically being overseas, and communicating through the internet;

numeral 16D denotes the internet;

numeral 16E denotes the computer of the human developer, being central regarding the computers of the QA stations, and being typically distanced therefrom;

numerals 18A and 18B denote configuration files; the configuration files may include information regarding conversion of formats of other plain text files;

numerals 20A1, 20A2 and 20A3 denote files produced after format conversion in the local computers;

numerals 20B1, 20B2 and 20B3 denote files having unified format, after being transferred to the central computer;

numeral 22 denotes an application running the central computer;

numeral 24 denotes an application running in the local computer;

numeral 26 denotes a screen of the local computer;

numeral 28 denotes the human developer of the mass products;

numerals 30A and 30B denote different formats; and numeral 32 denotes the QA station operator; the QA station operator is interested of receiving guiding information regarding failures of the QA, from the human developer; however, the human developer typically is located overseas.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A quality assurance system, comprising:
    a plurality of quality assurance stations, each being associated with a different local computer
        for examining a plurality of similar physical products by each of said local computers, and
        for producing from each physical product examination, a result thereof expressed by at least one source content in said local computer of the quality assurance station thereof,
        wherein said source contents of said plurality of similar physical products of each of said local computers comprise an equal format, being produced by that local computer, thereby said formats of said different local computers are different one from the other;
    a first configuration file, being present in each of said local computers, and being configured to convert from the format produced by that local computer, to a unified format;
    equal applications, each installed in one of said local computers, for running said conversion via said first configuration file, thereby converting said source contents to destination contents comprising a unified format; and
    an analyzing computer, for receiving said destination contents from said local computers,
        thereby said unified format accompanies said analyzing computer in analyzing said converted plain texts from distributed assurance stations.

2. A quality assurance system according to claim 1, further comprising:
    a second configuration file, being present in each of said local computers,
        for defining parameters of said examination of said at least one physical product, and
        for being used by said application in analysis of said source content having said unified format,
        thereby said application need not include a definition of said examination parameters.

3. A quality assurance method, comprising the steps of:
    examining a plurality of similar physical products, each by one of a plurality of quality assurance stations, each being associated with a different local computer;
    producing from each of said examinations at least one source content in the local computer of the quality assurance station thereof, wherein said source contents of said plurality of similar physical products of each of said local computers comprise an equal format, being produced by that local computer, thereby said formats of said different local computers are different one from the other;

preparing a configuration file, being present in each of said local computers, and being configured to convert from the format produced by that local computer, to a unified format;

running said converting, by said local computers, by running equal applications installed therein via said configuration file, thereby converting said source contents to destination contents comprising a unified format; and receiving said destination contents from local computers to a central computer,
thereby said unified format accompanies said central computer in analyzing said converted plain texts.

4. A quality assurance method according to claim 3, further comprising the steps of:

manually preparing said configuration file; and
manually transferring said prepared configuration file to said local computers.

5. A quality assurance method according to claim 3, wherein said step of analyzing said destination contents comprises computed comparing of different destination contents.

6. A quality assurance method according to claim 3, further comprising the step of:

amending said provided configuration files, and transferring thereof to said local computers,
thereby upon said running of said application by each of said local computers, obtaining a different format.

7. A quality assurance method according to claim 3, further comprising the step of:

initiating, by said local computers, periodical inquires from said central computer, whether said provided configuration files must be amended.

* * * * *